United States Patent
Fujiwara et al.

(10) Patent No.: US 9,630,584 B2
(45) Date of Patent: Apr. 25, 2017

(54) MOUNTING STRUCTURE OF AIR BAG DEVICE ON VEHICLE BODY

(71) Applicant: HONDA MOTOR CO., LTD., Tokyo (JP)

(72) Inventors: Shuhei Fujiwara, Wako (JP); Yoshihiko Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/793,150

(22) Filed: Jul. 7, 2015

(65) Prior Publication Data

US 2016/0009247 A1   Jan. 14, 2016

(30) Foreign Application Priority Data

Jul. 14, 2014 (JP) ................................. 2014-144381

(51) Int. Cl.
*B60R 21/207* (2006.01)
*B60R 21/217* (2011.01)
*B60R 21/16* (2006.01)

(52) U.S. Cl.
CPC ........ *B60R 21/207* (2013.01); *B60R 21/2171* (2013.01); *B60R 2021/161* (2013.01); *B60R 2021/2078* (2013.01)

(58) Field of Classification Search
CPC .............. B60R 21/207; B60R 21/2171; B60R 21/2176; B60R 2021/2078; B60R 2021/23146; B60R 2021/23153; B60R 2021/161; B60R 2021/2173

See application file for complete search history.

(56) References Cited

U.S. PATENT DOCUMENTS 5,533,750 A * 7/1996 Karlow ................. B60R 21/201
                                                           280/728.2
5,645,295 A * 7/1997 White, Jr. ........... B60R 21/2176
                                                           280/728.3
(Continued)

FOREIGN PATENT DOCUMENTS

DE   102013000049 A1 *  7/2014  ......... B60R 21/2171
FR       2827521 A1 *  1/2003  ......... B60R 21/2171
(Continued)

OTHER PUBLICATIONS

Notification of Reason for Refusal dated Dec. 13, 2016, issued in counterpart Japanese Application No. 2014-144381, with English translatiion (6 pages).

*Primary Examiner* — Laura Freedman
(74) *Attorney, Agent, or Firm* — Westerman, Hattori, Daniels & Adrian, LLP (57) ABSTRACT

A mounting structure of air bag device on vehicle body includes: a seat side block long in a vertical direction disposed on a side of a backrest portion of a seat; and an air bag unit including an inflator that injects high pressure gas at a time of application of an impact and a bag body that is deployed upon receiving the high pressure gas of the inflator. The airbag unit is built in the seat side block. The air bag unit along with the seat side block is mounted on a vehicle body side member. Retaining pieces are protrudingly provided in a retainer of the seat side block that holds the inflator and are inserted in openings of the vehicle body side member.

6 Claims, 6 Drawing Sheets

(56) References Cited

U.S. PATENT DOCUMENTS

| | | | | |
|---|---|---|---|---|
| 5,799,970 A * | 9/1998 | Enders | B60R 21/207 | |
| | | | 280/728.2 | |
| 6,039,341 A * | 3/2000 | Doxey | B60R 21/2176 | |
| | | | 280/728.2 | |
| 6,126,192 A * | 10/2000 | Enders | B60R 21/2176 | |
| | | | 280/728.2 | |
| 6,902,186 B2 * | 6/2005 | Suzuki | B60R 21/206 | |
| | | | 280/728.2 | |
| 7,267,363 B2 * | 9/2007 | Tredez | B60R 21/207 | |
| | | | 280/728.3 | |
| 7,530,595 B2 * | 5/2009 | Naruse | B60R 21/21 | |
| | | | 280/728.2 | |
| 7,658,400 B2 * | 2/2010 | Wipasuramonton | B60R 21/23138 | |
| | | | 280/728.2 | |
| 7,798,519 B2 * | 9/2010 | Kawabe | B60R 21/207 | |
| | | | 280/728.3 | |
| 7,862,078 B2 * | 1/2011 | Yokota | B60R 21/2171 | |
| | | | 280/728.2 | |
| 7,878,589 B2 * | 2/2011 | Murakami | B60N 2/42763 | |
| | | | 297/216.1 | |
| 8,196,954 B2 * | 6/2012 | Choi | B60R 21/2176 | |
| | | | 280/728.3 | |
| 8,534,701 B2 * | 9/2013 | Sosnowski | B60R 21/20 | |
| | | | 180/65.21 | |
| 8,651,518 B2 * | 2/2014 | Shamoto | B60N 2/289 | |
| | | | 280/730.2 | |
| 8,752,861 B2 * | 6/2014 | Fukawatase | B60N 2/289 | |
| | | | 280/728.2 | |
| 8,764,049 B2 * | 7/2014 | Lusk | B60R 21/207 | |
| | | | 280/728.2 | |
| 9,039,035 B1 * | 5/2015 | Faruque | B60R 21/207 | |
| | | | 280/728.2 | |
| 2002/0024198 A1 * | 2/2002 | Umezawa | B60R 21/207 | |
| | | | 280/728.2 | |
| 2006/0061073 A1 * | 3/2006 | Naruse | B60R 21/21 | |
| | | | 280/730.2 | |
| 2009/0039623 A1 * | 2/2009 | Kawabe | B60R 21/207 | |
| | | | 280/728.3 | |
| 2009/0039627 A1 * | 2/2009 | Yokota | B60R 21/201 | |
| | | | 280/730.2 | |
| 2015/0360636 A1 * | 12/2015 | Kaneko | B60N 2/449 | |
| | | | 280/730.2 | |
| 2016/0009248 A1 * | 1/2016 | Tanabe | B60R 21/276 | |
| | | | 280/728.2 | |

FOREIGN PATENT DOCUMENTS

| | | |
|---|---|---|
| JP | 2000-016224 A | 1/2000 |
| JP | 2009-113594 A | 5/2009 |
| WO | 2012/053082 A1 | 4/2012 |

* cited by examiner

MOUNTING STRUCTURE OF AIR BAG DEVICE ON VEHICLE BODY

CROSS REFERENCES TO RELATED APPLICATIONS

The present application claims priority under 35 U.S.C. §119 to Japanese Patent Application No. 2014-144381, filed Jul. 14, 2014, entitled "Mounting Structure of Air Bag Device on Vehicle Body." The contents of this application are incorporated herein by reference in their entirety.

BACKGROUND

1. Field

The present disclosure relates to a mounting structure of air bag device on vehicle body, the air bag device being installed in the sides of the backrest of a seat.

2. Description of the Related Art

In the backseats of some vehicles, a vertically long seat side block (side support portion) is disposed on a side of the back receiving portion of the seat, thereby supporting the side edge of backseats. In recent years, some air bag devices have been devised, in which an air bag unit is incorporated in such a seat side block (see, for instance, International Publication No. WO 2012/053082).

In the vehicle described in International Publication No. WO 2012/053082, the front face side of a resin block frame of the seat side block is provided with a housing recessed portion for housing an air bag unit, the upper portion of the block frame is provided with a claw portion that is inserted in a vehicle body side member from upward, and the lower portion of the block frame is provided with a mounting portion which is fixed to the vehicle body side member with a screw. In this case of the vehicle, with the air bag unit installed in the housing recessed portion of the block frame of the seat side block, the seat side block is fixed to the vehicle body side member by the upper claw portion and the lower mounting portion.

However, in the case of the mounting structure of air bag device on vehicle body described in International Publication No. WO 2012/053082, the vertically long seat side block is fixed to the vehicle body side member at the upper and lower portions of the block frame, and thus it is difficult to adjust the deployment direction of the air bag unit to an appropriate direction, the air bag unit being installed in approximately the central area of the block frame in a vertical direction.

SUMMARY

Thus, the present disclosure provides a mounting structure of air bag device on vehicle body, the mounting structure enabling the deployment direction of an air bag unit to be set to an appropriate direction.

A mounting structure of air bag device on vehicle body according to the present disclosure adopts the following configuration to solve the above-mentioned problem. A first aspect of the present disclosure provides a mounting structure of air bag device on vehicle body, the mounting structure including: a seat side block (for instance, the seat side block 5 in the embodiment described below) long generally in a vertical direction (i.e., along its longitudinal direction) disposed on a side of a back receiving (i.e., backrest) portion (for instance, the seat back body 4 in the embodiment) of a seat; and an air bag unit (for instance, the air bag unit 13 in the embodiment) including an inflator (for instance, the inflator 15 in the embodiment) that injects high pressure gas at a time of application of an impact and a bag body (for instance, the bag body 16 in the embodiment) that is deployed upon receiving the high pressure gas of the inflator, the air bag unit being built in the seat side block, the air bag unit along with the seat side block being mounted on a vehicle body side member (for instance, the rear wheel house 20 in the embodiment). The vicinity of the inflator of the seat side block is provided with a rotation restriction member (for instance, a plurality of supporting members such as the retaining pieces 30a, 30b in the embodiment) that is retained to the vehicle body side member and that restricts rotation of the air bag unit around an axis substantially parallel to a vertical direction.

In this manner, it is possible to retain the vicinity of the inflator in the seat side block to the vehicle body side member by the rotation restriction member, the inflator being a heavy object. As a result, rotation of the air bag unit around an axis substantially parallel to a vertical direction is restricted.

A second aspect of the present disclosure provides the mounting structure of air bag device on vehicle body according to the first aspect, in which the seat side block includes a housing recessed portion (for instance, the housing recessed portion 14 in the embodiment) that houses the air bag unit and a metal retainer (for instance, the retainer 25 in the embodiment) that retains the inflator on a backside of the housing recessed portion, and the rotation restriction member includes one or more retaining pieces (for instance, the retaining pieces 30a, 30b in the embodiment) that are protrudingly provided at their proximal ends in the retainer and that are inserted at their distal ends in one or more openings (for instance, the openings 32a, 32b in the embodiment) of the vehicle body side member.

In this case, it is possible to easily form the retaining pieces in the metal retainer by cutting to raise or bending the metal retainer.

A third aspect of the present disclosure provides the mounting structure of air bag device on vehicle body according to the second aspect, in which the one or more retaining pieces are provided at a plurality of locations spaced apart in a direction crossing the vertical direction of the seat side block.

In this case, it is possible to efficiently restrict the rotation of the air bag unit around an axis substantially parallel to a vertical direction by the rotation restriction members that are provided in multiple locations.

A fourth aspect of the present disclosure provides the mounting structure of air bag device on vehicle body according to the third aspect, in which at least one of the one or more retaining pieces is provided with a bent portion (for instance, the bent portion 30a-1 in the embodiment) that allows contact with an edge of the one or more openings.

In this case, when an air bag unit starts to rotate due to excessive force applied circumferentially around an axis substantially parallel to a vertical direction, the bending portion of the at least one retaining piece comes into contact with the edge of an opening of the vehicle body side member to restrict the rotation. Therefore, it is possible to reliably restrict the rotation of the air bag unit around an axis substantially parallel to a vertical direction.

A fifth aspect of the present disclosure provides the mounting structure of air bag device on vehicle body according to any one of the second to fourth aspects, in which one of an upper portion and a lower portion of the seat side block is provided with an insertion retaining portion (namely, a first engagement portion such as the retaining protrusion 18 in the embodiment) that is inserted in the vehicle body side member by displacement of the seat side block in the vertical direction (an insertion motion from its disengagement position to engagement position with respect to the vehicle body side member), the other of the upper portion and the lower portion of the seat side block is provided with a fastening and fixing portion (namely, a second engagement portion such as the fastening and fixing portion 19a in the embodiment) that is fastened and fixed in a direction crossing the vertical direction of the seat side block (a fixing motion at the engagement position), and the one or more openings of the vehicle body side member are each formed to be longer than or equal to an insertion stroke of the insertion retaining portion in an insertion direction of the insertion retaining portion so that the first engagement portion is movable from the disengagement position to the engagement position even if the one or more support members are already inserted in the one or more openings of the vehicle body side member.

When the seat side block incorporating the air bag unit is mounted on the vehicle body side member, first, the retaining piece of the retainer is inserted in the opening of the vehicle body side member, the seat side block is displaced in a vertical direction with the retaining piece inserted in the opening, and the upper-side or lower-side insertion retaining portion of the seat side block is inserted in the vehicle body side member. Subsequently, the upper-side or lower-side fastening and fixing portion of the seat side block is connected and fixed to the vehicle body side member in a direction crossing the vertical direction of the seat side block. Therefore, when this structure is adopted, it is possible to easily mount the air bag unit along with the seat side block on the vehicle body side member.

DESCRIPTION OF THE PREFERRED EMBODIMENTS

Hereinafter, an embodiment of the present disclosure will be described with reference to the drawings. In the following description, the front and rear, and the upper and lower directions refers to the directions with respect to the vehicle body unless otherwise stated. Also, in the diagrams, arrow FR indicates the front side of the vehicle, arrow UP indicates the upper side of the vehicle, and arrow LH indicates the left side of the vehicle.

Figure 1:
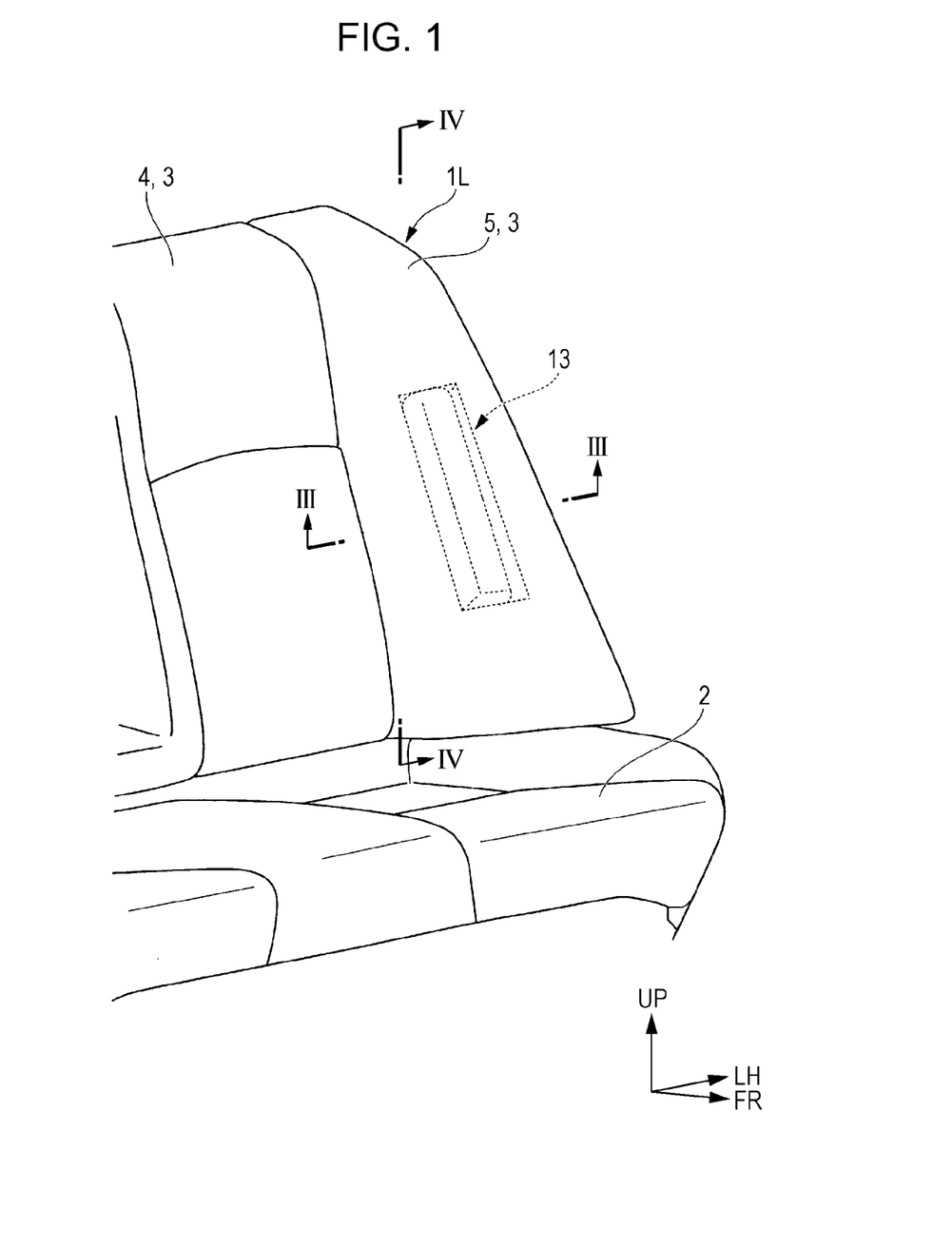
FIG. 1 is a perspective view illustrating the backseat of a vehicle in an embodiment of the present disclosure.

FIG. 1 is a view illustrating the backseat of a vehicle according to an embodiment. As illustrated in FIG. 1, left seat 1L in the back of the vehicle includes a seat cushion 2 that supports the buttocks of a passenger and a seat back 3 that is in rear of the seat cushion 2 and supports the back of a passenger. Although detailed description will be omitted hereinafter, the right seat in the back of the vehicle is symmetric to the left seat 1L and has a similar structure.

The seat back 3 includes a seat back body 4 (back receiving portion) that supports the center of the back of a passenger, and a seat side block 5 that is disposed adjacent to the left side of the seat back body 4 and that supports the left side of the upper half body of a passenger. The seat back body 4 is inclinedly supported on the vehicle body, and the seat side block 5 is fixedly installed in the vehicle body.

Figure 2:
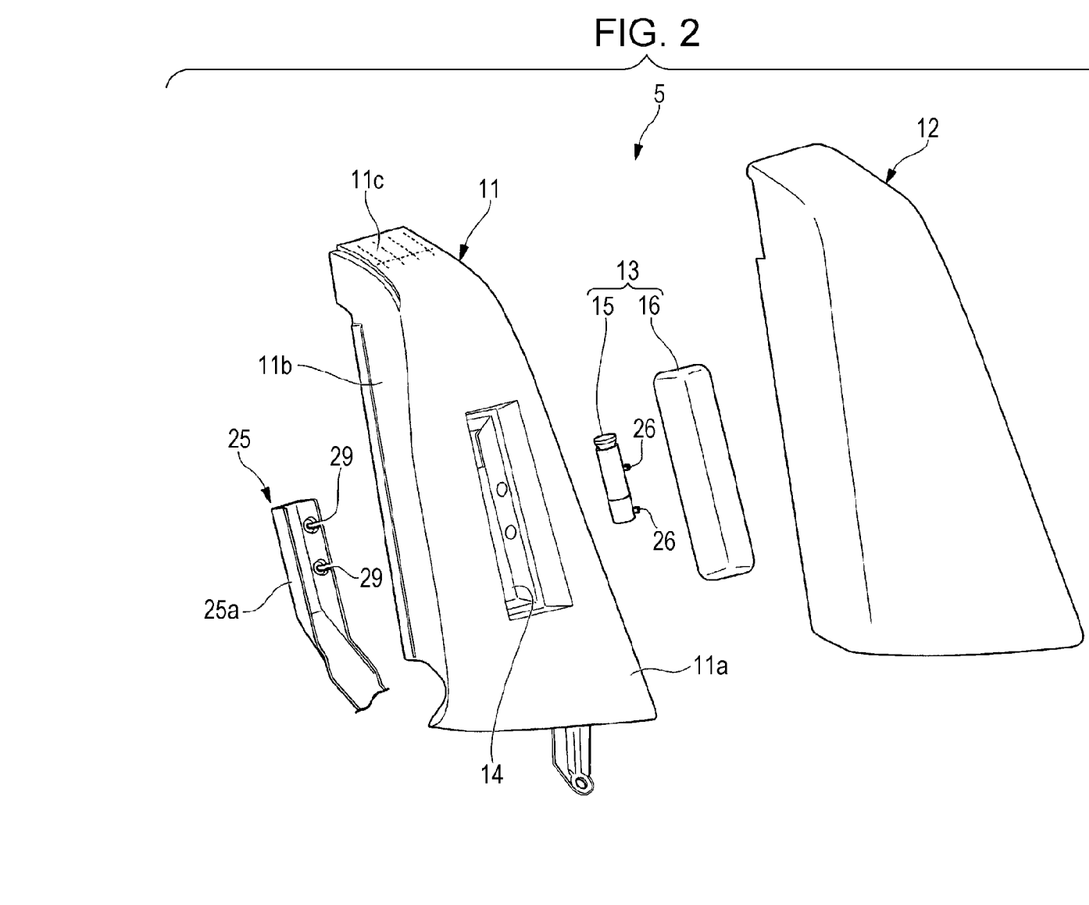
FIG. 2 is an exploded perspective view of a seat side block in the embodiment of the present disclosure.
Figure 3:
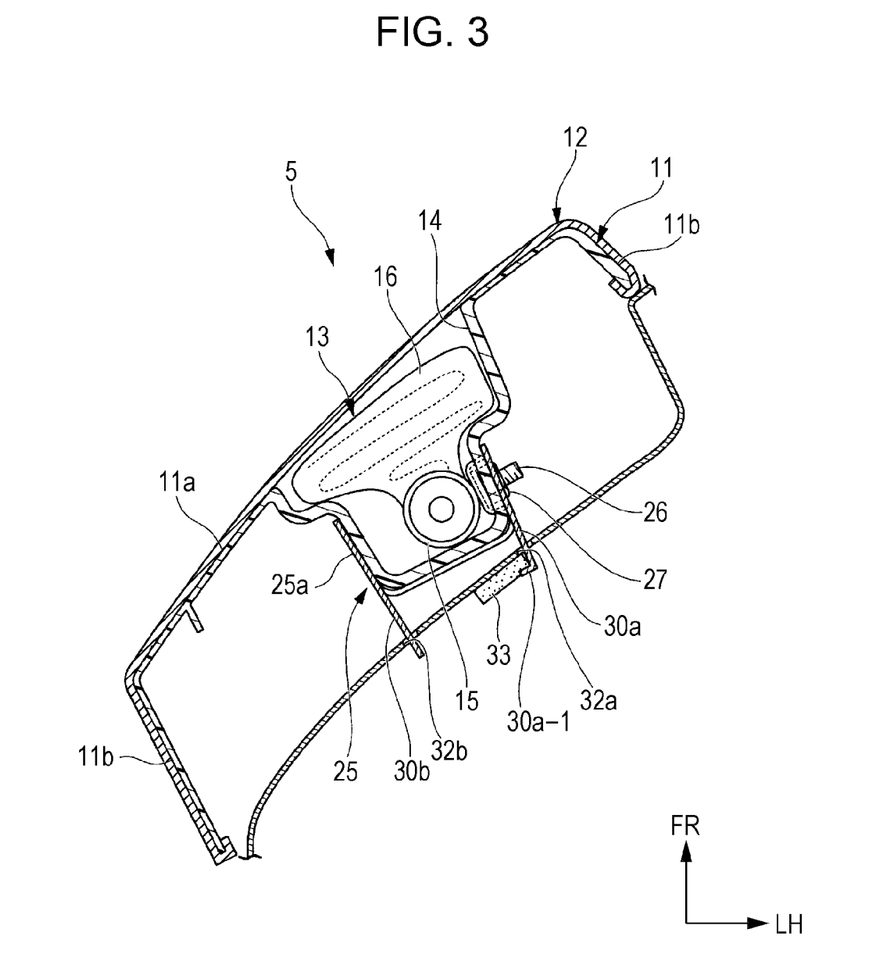
FIG. 3 is a cross-sectional view taken along line III-III of FIG. 1 in the embodiment of the present disclosure.
Figure 4:
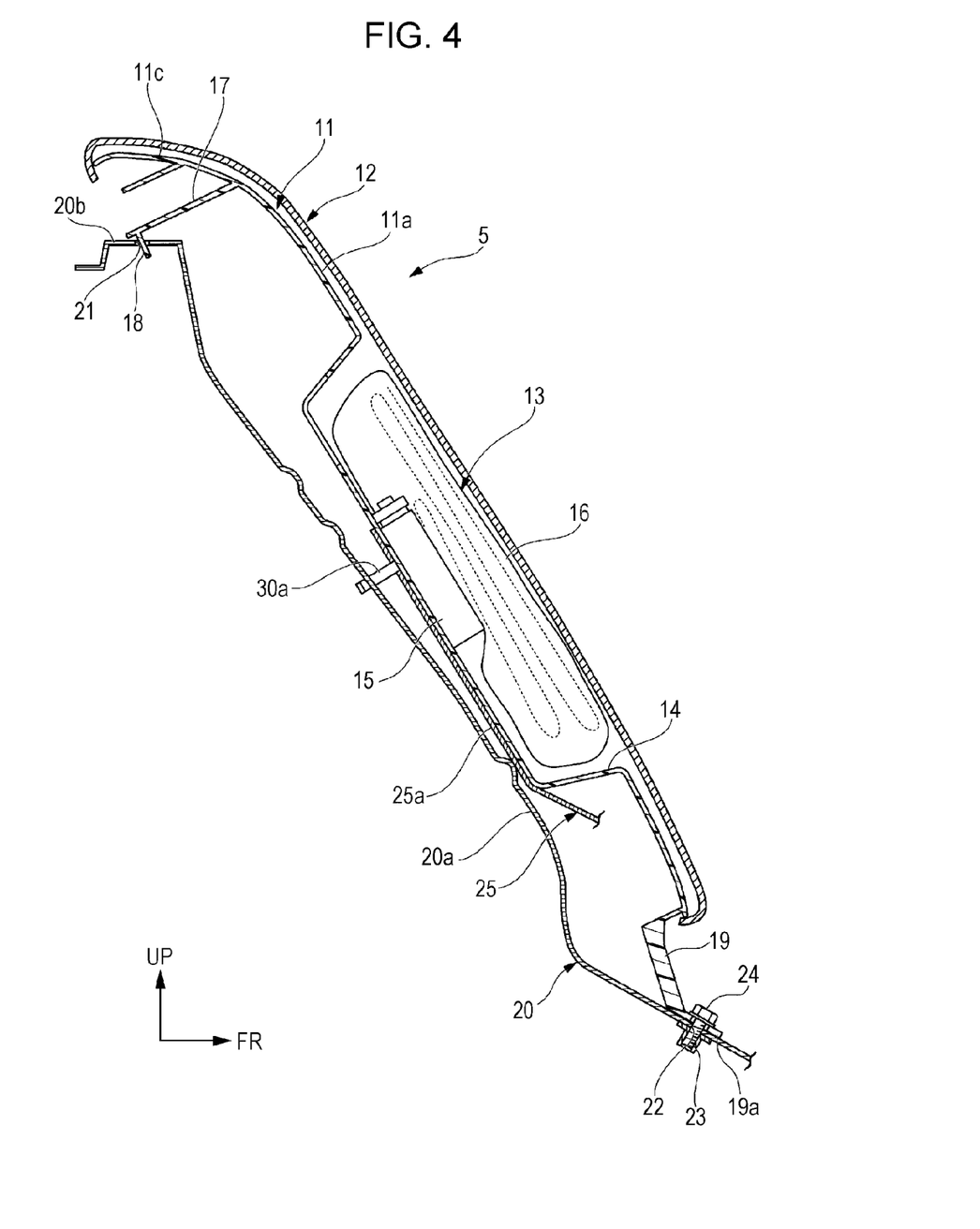
FIG. 4 is a cross-sectional view taken along line IV-IV of FIG. 1 in the embodiment of the present disclosure.

FIG. 2 is an exploded view of the seat side block 5, and FIGS. 3 and 4 are cross-sectional views taken along line III-III and line IV-IV of FIG. 1, respectively. The seat side block 5 includes a resin block frame 11, and an outer layer member 12 that covers the outer surface of the block frame 11. An air bag unit 13 of an air bag device is incorporated in the front face side of the block frame 11.

The block frame 11 is formed to be vertically long approximately rectangular in front view. The block frame 11 has side walls 11b that bend toward the rear side of the vehicle body and that are on both sides of a front wall 11a facing the front side of the vehicle body, and an upper wall 11c that smoothly continues to the upper portion of the front wall 11a and that extends to the rear side of the vehicle body. The front wall 11a of the block frame 11 is inclined outward in a vehicle width direction so as to bulge forward, and is capable of holding the left side of the upper half body of a passenger seated on the left seat 1L from the lateral side in an encompassing manner.

The front wall 11a of the block frame 11 has a housing recessed portion 14 that is depressed toward the rear side of the vehicle body. The housing recessed portion 14 is formed to be vertically long approximately rectangular in front view and is designed to house the air bag unit 13 therein. The air bag unit 13 includes an inflator 15 that injects high pressure gas at the time of application of an impact, and a bag body 16 that is deployed upon receiving high pressure gas injected by the inflator 15.

The inflator 15 is disposed near the base side of the housing recessed portion 14 of the block frame 11 in vertically oriented, and the bag body 16 is disposed to be folded near the front face side of the inflator 15. The bag body 16 is developed forward upon receiving high pressure gas of the inflator 15 at the time of operation of the air bag device, and a portion of the outer layer member 12, facing the front side of a housing of the bag body 16 is provided with a breakage inducing portion (not illustrated) that breaks at the time of expansion and deployment of the bag body 16.

The backside of the upper end of the front wall 11a of the block frame 11 is protrudingly provided with a plate-like support rib 17, and a retaining protrusion 18 (insertion retaining portion) that projects downward is integrally formed at approximately the central position of the support rib 17 of the block frame 11 widthwise. Also, a fastening piece 19 that extends downward is integrally formed at approximately the central position of the lower end of the block frame 11 widthwise. The end of the fastening piece 19 has a flat fastening and fixing portion 19a having a screw hole (symbol omitted).

Here, as illustrated in FIGS. 3 and 4, the seat side block 5 is mounted on the front face, inside the vehicle cabin, of a rear wheel house 20, which is a vehicle body side member on the left side of the vehicle body. The rear wheel house 20 is integrally provided with a bent top 20b that is in the upper portion of a front wall portion 20a that extends diagonally rearward and upward direction from the lower end the rear wheel house 20. As illustrated in FIG. 3, a horizontal section of the front wall portion 20a of the rear wheel house 20 is inclined toward the front side of the vehicle body outward in a vehicle width direction.

The bent top 20b of the rear wheel house 20 has a fixed hole 21 for retaining the upper end of the block frame 11 and the retaining protrusion 18 of the upper end side of the block frame 11 is inserted into the fixed hole 21 from the upper side. Also, a connection hole 22 is formed at the lower edge of the front wall portion 20a of the rear wheel house 20, and a weld nut 23 is provided coaxially with the connection hole 22. A bolt 24 is inserted into the connection hole 22, the bolt 24 penetrating through the fastening and fixing portion 19a at the lower end of the seat side block 5, and the bolt 24 is tightened into the weld nut 23. With the upper end side of the seat side block 5 retained to the bent top 20b of the rear wheel house 20 by the retaining protrusion 18 and the fixed hole 21, the fastening and fixing portion 19a at the lower end is connected and fixed to the lower edge of the front wall portion 20a of the rear wheel house 20 by the bolt 24. In the case of this embodiment, the center axis of the inflator 15 held by the seat side block 5 is set to be substantially parallel to the straight line connecting the retaining position on the upper side with the retaining protrusion 18 and the fixed hole 21 of the seat side block 5, and the fixed position on the lower side with the bolt 24 and the nut 23.

In addition, a metal retainer 25 having a channel portion 25a is disposed on the backside of the housing recessed portion 14 of the seat side block 5. The channel portion 25a of the retainer 25, which is fitted in the backside of the housing recessed portion 14 of the seat side block 5, is connected and fixed to a pair of screw shafts 26 that is protrudingly provided in the inflator 15 of the air bag unit 13. The pair of screw shafts 26 is screwed in a nut 27 with the screw shafts 26 penetrating through the side wall of the housing recessed portion 14 of the seat side block 5 and the side wall of the channel portion 25a of the retainer 25.

Figure 5:
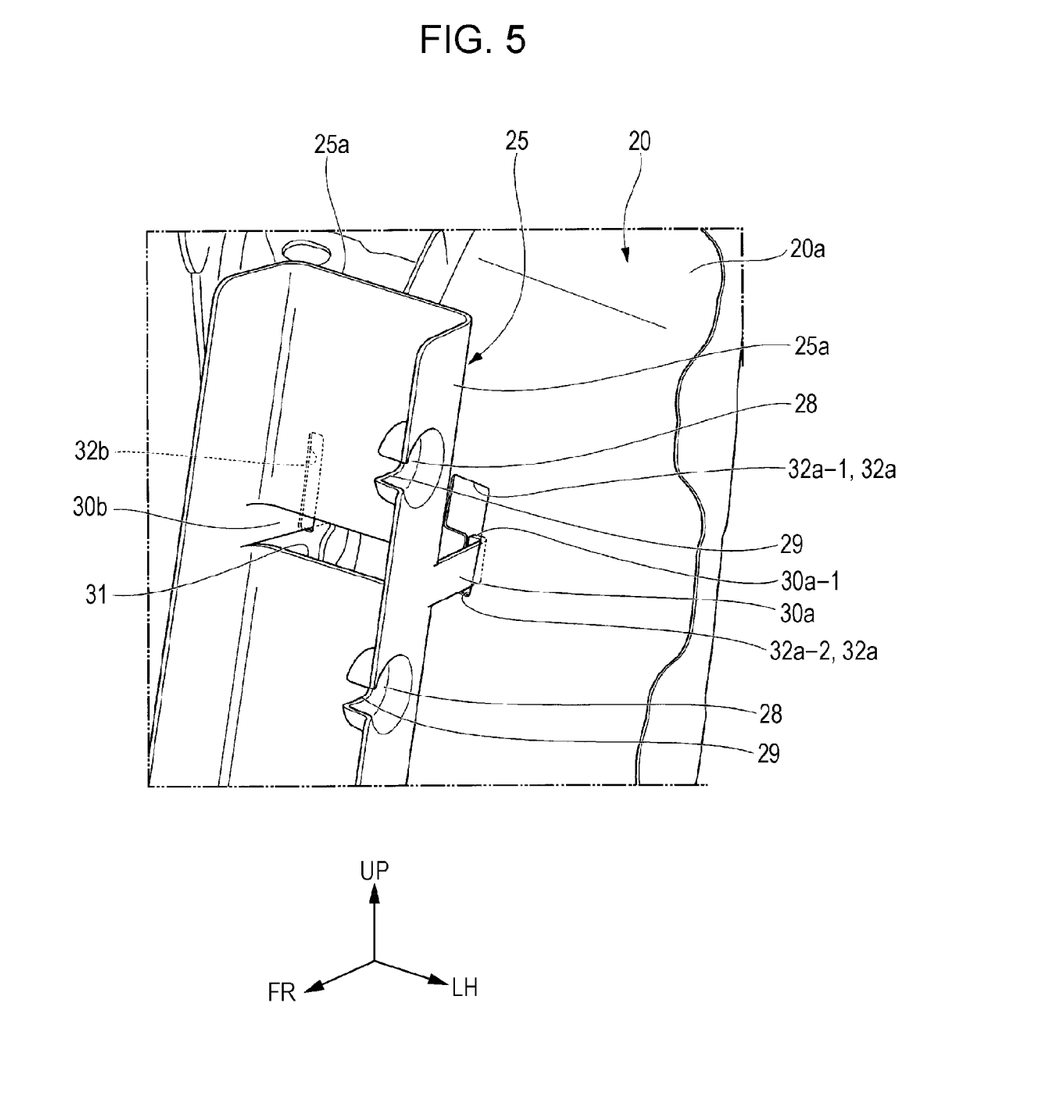
FIG. 5 is a perspective view illustrating a retained state of a retainer with respect to a vehicle body side member in the embodiment of the present disclosure.
Figure 6:
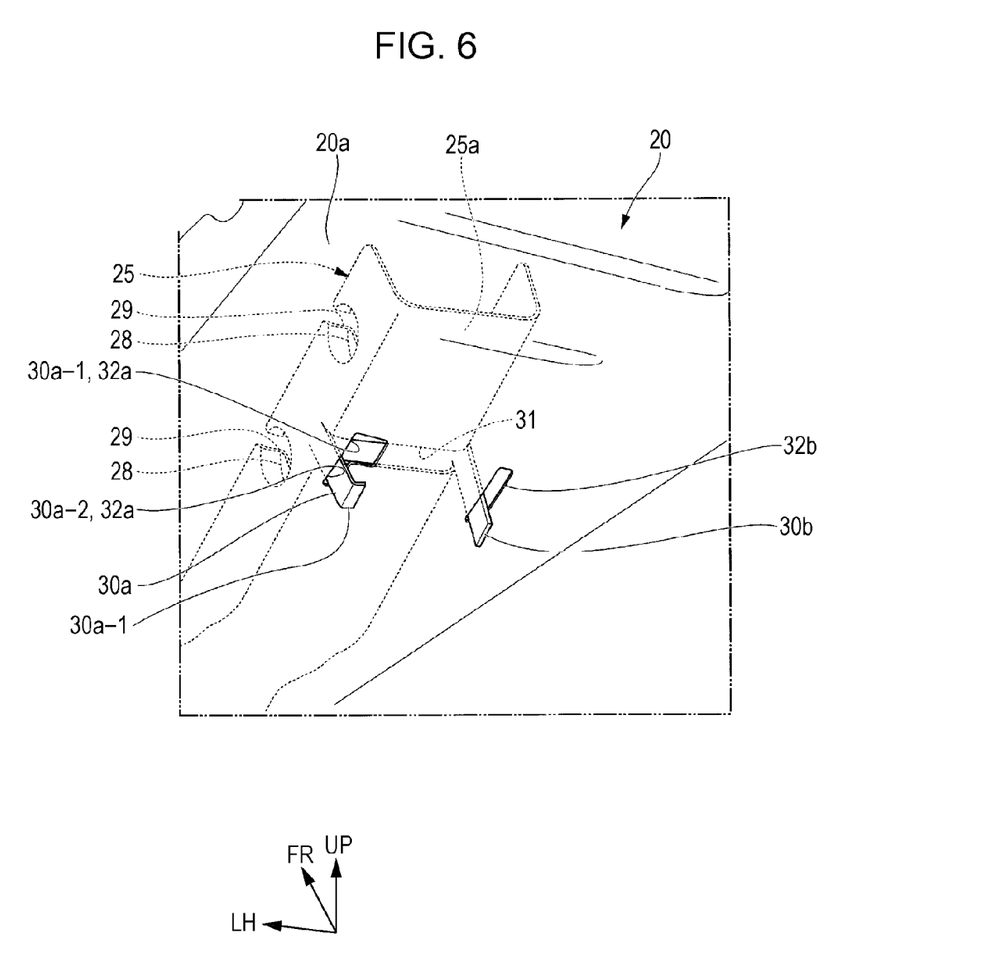
FIG. 6 is a perspective view illustrating a retained state of a retainer with respect to a vehicle body side member in the embodiment of the present disclosure.

FIG. 5 is a view of the retainer 25 as seen from the front face side of the front wall portion 20a of the rear wheel house 20, and FIG. 6 is a view of the retainer 25 as seen from the rear face side of the front wall portion 20a of the rear wheel house 20. As illustrated in FIGS. 5 and 6, one of the side walls of the channel portion 25a of the retainer 25 is provided with a pair of circular depressed portions 28, and a slit 29 is formed at the base of each of the depressed portions 28. The pair of screw shafts 26 protrudingly provided in the inflator 15 is inserted in the rear wheel house 20 and the slit 29 of each depressed portion 28. With the inflator 15 disposed on the base side in the housing recessed portion 14 of the block frame 11 and the screw shafts 26 inserted in the side wall of the housing recessed portion 14 and each slit 29 of the retainer 25, the nut 27 is tightened into each end of the screw shafts 26, and the air bag unit 13 is thereby fixed to the block frame 11 and the retainer 25 together. Therefore, the inflator 15 of the air bag unit 13 is held by the metal retainer 25 via the housing recessed portion 14.

The channel portion 25a of the retainer 25 has a pair of approximately rectangular retaining pieces 30a, 30b that are cut and raised and spaced apart in a width direction (a direction perpendicular to a longitudinal direction). Each of the retaining pieces 30a, 30b is cut and raised in a width direction of the channel portion 25a, and protrudes outwardly of the base wall of the channel portion 25a substantially perpendicularly to the base wall. One retaining piece 30a located outward in a vehicle width direction is provided with a bent portion 30a-1 that is bent inwardly in a width direction of the retainer 25 at the distal end. In contrast to this, the other retaining piece 30b extends linearly without being bent. The protrusion height of the other retaining piece 30b from the base wall of the channel portion 25a is set to be higher than the protrusion height of the one retaining piece 30a from the base wall of the channel portion 25a by approximately the extended length of the bent portion 30a-1. Also, the protrusion positions of the pair of retaining pieces 30a, 30b on the retainer 25 are set on both side positions on the right and left between which the axis of the cylindrical inflator 15 is interposed. It is to be noted that the symbol 31 in FIGS. 5 and 6 indicates the hole that is formed in the base wall of the channel portion 25a as a consequence of cutting and raising the retaining pieces 30a, 30b from the channel portion 25a of the retainer 25.

On the other hand, the front wall portion 20a of the rear wheel house 20 has a pair of openings 32a, 32b into which the retaining pieces 30a, 30b of the retainer 25 are inserted when the seat side block 5 is mounted on the vehicle body. One opening 32a, into which the one retaining piece 30a is inserted, is formed in an approximately L shape in which a vertically long slit-shaped opening 32a-2 is successively formed below an approximately rectangular opening 32a-1. The rectangular opening 32a-1 is formed to have such shape and size that allow insertion of the bent portion 30a-1 of the retaining piece 30a. Also, the other opening 32b, into which the other retaining piece 30b is inserted, is formed to be vertically long approximately slit-shaped. The vertical extended length of the other opening 32b is set to be approximately twice the length of the vertical width of the retaining piece 30b. The openings 32a, 32b are formed to be substantially vertical and longer than or equal to the insertion stroke of the retaining protrusion 18 of the block frame 11 into the fixed hole 21 of the rear wheel house 20.

When the seat side block 5 is attached to the vehicle body, the retaining pieces 30a, 30b of the retainer 25 are first inserted in the upper portions of the openings 32a, 32b in the rear wheel house 20, and with this condition, the entire seat side block 5 is slided downward, and thus moved to the lower portions of the openings 32a, 32b as illustrated in FIGS. 5 and 6. As a result, the bent portion 30a-1 of the one retaining piece 30a faces the side edge of the vertically long opening 32a-2. At this point, as illustrated in FIG. 3, an elastic member 33 such as a sponge rubber is bonded to the side edge of the vertically long opening 32a-2 in the retainer 25, that faces the bent portion 30a-1. The elastic member 33 avoids direct contact between the bent portion 30a-1 of the metal retainer 25 and the side edge of the vertically long opening 32a-2 in the metal rear wheel house 20, and avoids the occurrence of unusual sound due to contact between the both.

In the seat side block 5 according to this embodiment, the outer layer member 12 is mounted on the outer surface of the block frame 11 with the air bag unit 13 disposed in the housing recessed portion 14 of the block frame 11 and the retainer 25 attached to the backside of the housing recessed portion 14. The seat side block 5, which has been pre-assembled as a unit in another location, is mounted on the rear wheel house 20 of the vehicle body.

When the unit of the seat side block 5 is mounted on the rear wheel house 20, first, the retaining pieces 30a, 30b of the retainer 25 at approximately the central position of the backside of the seat side block 5 are inserted in the upper portions of the openings 32a, 32b in the front wall portion 20a of the rear wheel house 20, and with this condition, the retaining protrusion 18 of the backside of the upper edge of the seat side block 5 is inserted into the fixed hole 21 of the bent top 20b of the rear wheel house 20 from the upper side. In this manner, when the entire seat side block 5 is slided downward in order to insert the retaining protrusion 18 into the fixed hole 21, the retaining pieces 30a, 30b of the retainer 25 are moved to the lower portions of the openings 32a, 32b in the rear wheel house 20. At this point, the bent portion 30a-1 of the one retaining piece 30a comes into contact with the elastic member 33 which is bonded to the edge of the opening 32a. Subsequently, the fastening piece 19 (fastening and fixing portion 19a) at the lower edge of the seat side block 5 is fastened and fixed to the lower edge of the front wall portion 20a of the rear wheel house 20 by the bolt 24. In this manner, the seat side block 5 is fixed to the rear wheel house 20.

In the mounting structure of air bag device on vehicle body according to this embodiment, as described above, the vicinity of the inflator 15 of the seat side block 5 is provided with the retaining pieces 30a, 30b which are rotation restriction members, and the retaining pieces 30a, 30b are inserted in and engaged with the openings 32a, 32b in the rear wheel house 20. Thus, it is possible to restrict the rotation of the vicinity of the inflator to the front wall portion 20a of the rear wheel house 20 in a width direction, the inflator 15 being a heavy object of the seat side block 5.

Specifically, the seat side block 5 is supported by the front wall portion 20a of the rear wheel house 20 at the two positions which are the retaining portion on the upper side with the retaining piece 19 and the fixed hole 21, and the fixing portion with the bolt 24 on the lower side. The rotation around an axis substantially parallel to a vertical direction connecting the retaining portion and the fixing portion is restricted by the engagement portions between the pair of retaining pieces 30a, 30b and the openings 32a, 32b. Therefore, in the mounting structure on vehicle body according to this embodiment, it is possible to set the deployment direction of the air bag unit 13 to an appropriate direction easily without making a difficult adjustment and to efficiently receive reaction force at the time of deployment of the bag body 16 by the engagement portions between the retaining pieces 30a, 30b and the openings 32a, 32b.

Although the rotation restriction member provided in the vicinity of the inflator 15 of the seat side block 5 may be disposed in a location other than the metal retainer 25, in this embodiment, the retaining pieces 30a, 30b are protrudingly provided in the metal retainer 25 attached to the backside of the housing recessed portion 14 of the block frame 11. Thus, it is possible to easily form the rotation restriction member by cutting and raising the retaining pieces 30a, 30b from part of the metal retainer 25. It is to be noted that the retaining pieces 30a, 30b may be formed by simple bending rather than cutting and raising if the portions to be the retaining pieces 30a, 30b are pre-formed on the metal plate for the retainer 25.

Although only one rotation restriction member may be provided in the vicinity of the inflator 15, in this embodiment, the retaining pieces 30a, 30b are provided as the rotation restriction members at two positions spaced apart in a direction crossing the vertical direction of the seat side block 5, and thus it is possible to efficiently restrict the rotation of the air bag unit 13 around an axis substantially parallel to a vertical direction. In particular, when the retaining pieces 30a, 30b are protrudingly provided on the right and left sides between which the axis of the inflator 15 is interposed as in this embodiment, the rotation of the air bag unit 13 may be restricted more efficiently.

Furthermore, in the mounting structure on vehicle body according to this embodiment, the one retaining piece 30a is provided with the bent portion 30a-1 that allows contact with the edge of the backside of the opening 32a, and thus when the air bag unit 13 starts to rotate due to excessive force applied circumferentially around an axis substantially parallel to a vertical direction, the bent portion 30a-1 of the retaining piece 30a comes into contact with the edge of the backside of the opening 32a and the rotation of the air bag unit 13 is strongly controllable.

In the case of this embodiment, because the edge of the backside of the opening 32a, which is to be in contact with the bent portion 30a-1, is provided with the elastic member 23, it is possible to avoid occurrence of unusual sound which is due to direct contact of the bent portion 30a-1 with the metal wheel house 20 at the time of normal use.

In the case of this embodiment, since the protrusion height of the retaining piece 30b inward in a vehicle width direction is set to be higher than the protrusion height of the outward retaining piece 30a, the rotation of the air bag unit 13 may be reliably restricted by the retaining piece 30b regardless of the change in shape of the section of the rear wheel house 20.

In addition, in the mounting structure on vehicle body according to this embodiment, the retaining portion between the retaining protrusion 18 and the fixed hole 21 is provided on the upper side of the seat side block 5, the fixing portion by the bolt 24 is provided on the lower side of the seat side block 5, and the openings 32a, 32b in the front wall portion 20a of the rear wheel house 20 are formed to be longer than or equal to the insertion stroke of the retaining protrusion 18 to the fixed hole 21, the openings 32a, 32b into which the retaining pieces 30a, 30b of the retainer 25 are inserted. Consequently, when the seat side block 5 is mounted on the rear wheel house 20, the retaining pieces 30a, 30b of the retainer are first inserted in the openings 32a, 32b, and subsequently, the seat side block 5 is slided downward to insert the retaining protrusion 18 into the fixed hole 21, and with this condition, the lower edge of the seat side block 5 may be easily mounted on the rear wheel house 20. Therefore, workability of assembling the seat side block 5 may be improved by adopting this structure.

It is to be noted that the present disclosure is not limited to the above-described embodiment and various changes may be made within a range not departing from the gist of the present disclosure.

What is claimed is:

1. A mounting structure of an air bag device on a vehicle body, the mounting structure comprising:
   a seat side block disposed generally in a vertical direction on a side of a backrest portion of a seat and having a longitudinal direction along the vertical direction, the seat side block at an upper end and lower end thereof having engagement portions that fix the seat side block to a vehicle body side member, the seat side block having a block frame forming a recessed portion;
   an air bag unit housed in the recessed portion of the seat side block and comprising an inflator that injects high pressure gas at a time of application of an impact and a bag body that is deployed upon receiving the high pressure gas of the inflator, the air bag unit and the seat side block being mounted on the vehicle body side member with the engagement portions of the seat side block; and
   a metal retainer that is provided to the back side portion of the recessed portion and supports the inflator housed in the recessed portion, wherein
   the inflator has a projection member that penetrates both the recessed portion of the block frame and the metal retainer so as to fix the inflator to the metal retainer,
   the metal retainer is fixed to the vehicle body side member and provided with a rotation restriction member that engages with the vehicle body side member in a manner that restricts a rotation of the air bag unit around an axis substantially parallel to the longitudinal direction, and the rotation restriction member comprises one or more support members that protrude from the retainer and extend to the vehicle body side member, the support members being inserted in one or more openings of the vehicle body side member.

2. The mounting structure of the air bag device on the vehicle body according to claim 1, wherein the one or more support members are provided at a plurality of locations spaced apart in a direction crossing the longitudinal direction of the seat side block.

3. The mounting structure of the air bag device on the vehicle body according to claim 2, wherein at least one of the one or more support members is bent thereof in a manner that engages with an edge of the one or more openings.

4. The mounting structure of the air bag device on the vehicle body according to claim 1, wherein the engagement portions of the seat side block comprise a first engagement portion and a second engagement portion, the first engagement portion is inserted in the vehicle body side member to engage therewith, the first engagement portion being movable from a disengagement position to an engagement position in the longitudinal direction, the second engagement portion is fastened and fixed to the vehicle body side member in a direction crossing the longitudinal direction in a state where the first engagement portion is in the engagement position, and the one or more openings of the vehicle body side member have a length longer than or equal to an insertion stroke of the first engagement portion in an insertion direction of the first engagement portion such that the first engagement portion is movable from the disengagement position to the engagement position in a state where the one or more support members are inserted in the one or more openings of the vehicle body side member.

5. The mounting structure of the air bag device on the vehicle body according to claim 1, wherein the back side portion of the recessed portion has a protruded portion which is protruded toward a back side of the vehicle body and is recessed inward from a front side portion of the recessed portion in a vehicle width direction, the inflator is disposed in the protruded portion, and the metal retainer is fitted with at least a back side portion of the protruded portion in a manner that covers the back side portion of the protruded portion.

6. The mounting structure of the air bag device on the vehicle body according to claim 1, wherein the one or more support members are integral portions of the metal retainer which are formed by cutting to raise portions of the metal retainer.

* * * * *